T. L. R. D'ORVILLE.
LUBRICATING SYSTEM FOR INTERNAL COMBUSTION ENGINES.
APPLICATION FILED MAR. 28, 1917.

1,264,494.

Patented Apr. 30, 1918.

INVENTOR
THEODORE LIVINUS REEPMAKER d'ORVILLE
By
Attorney.

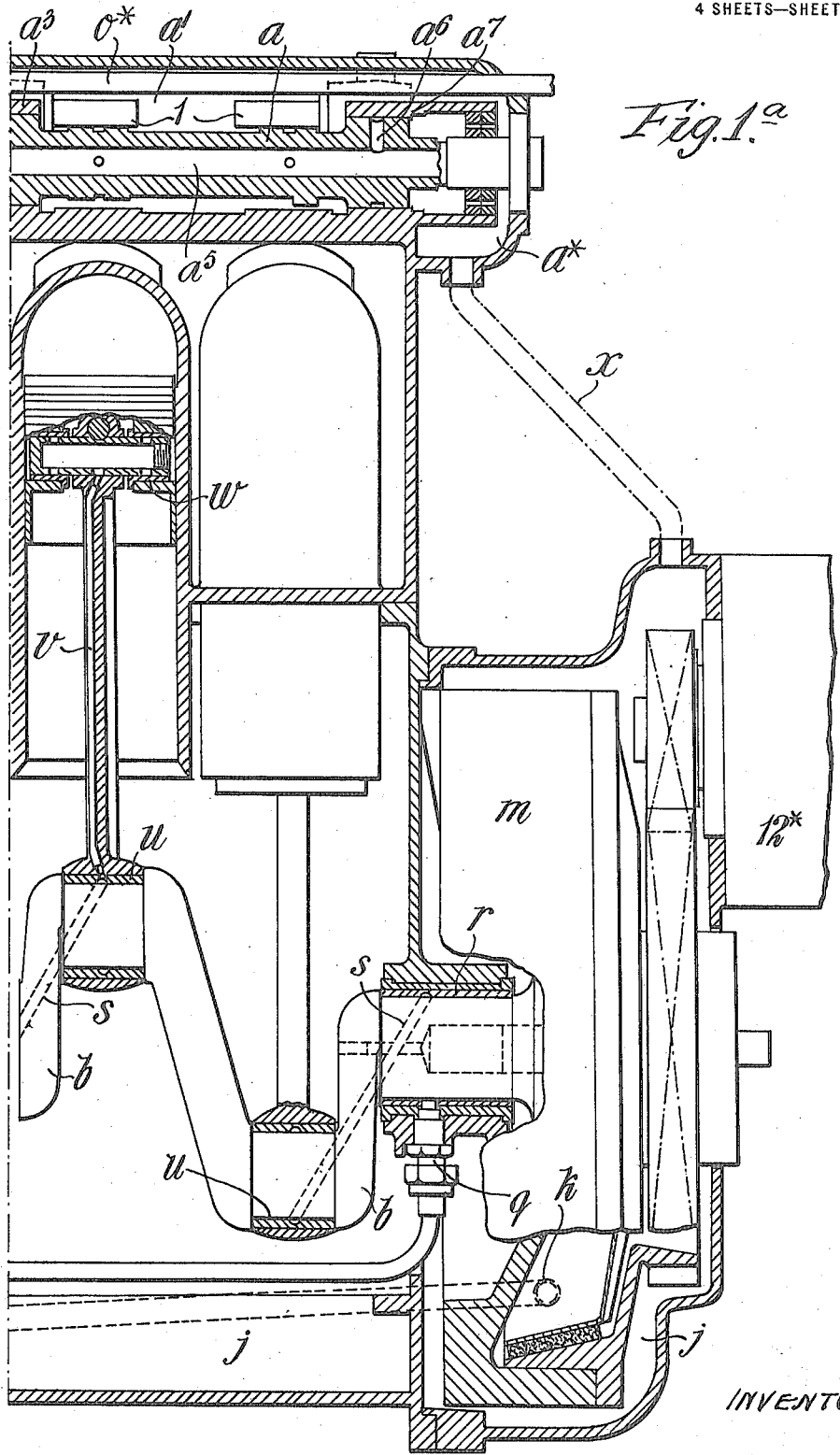

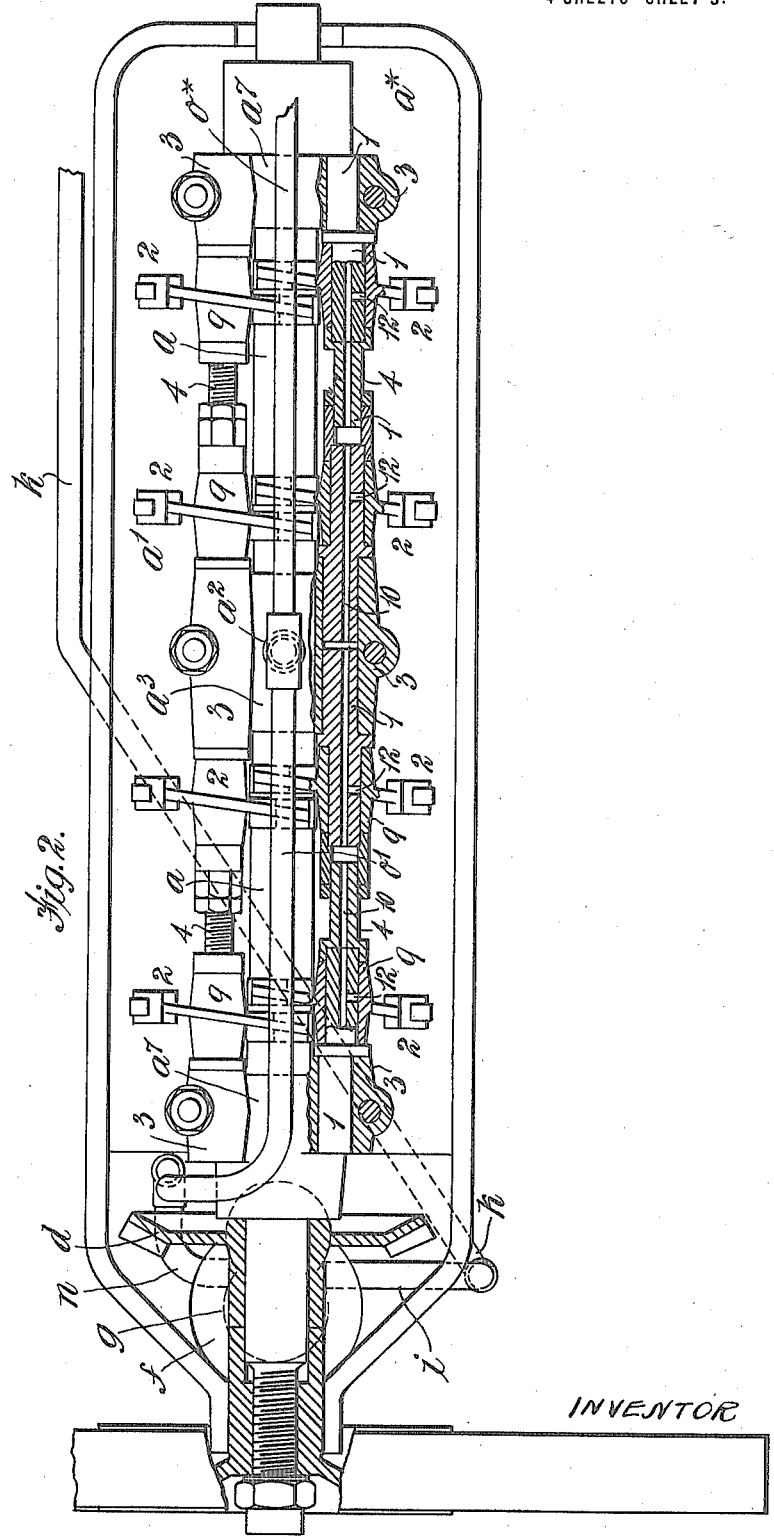

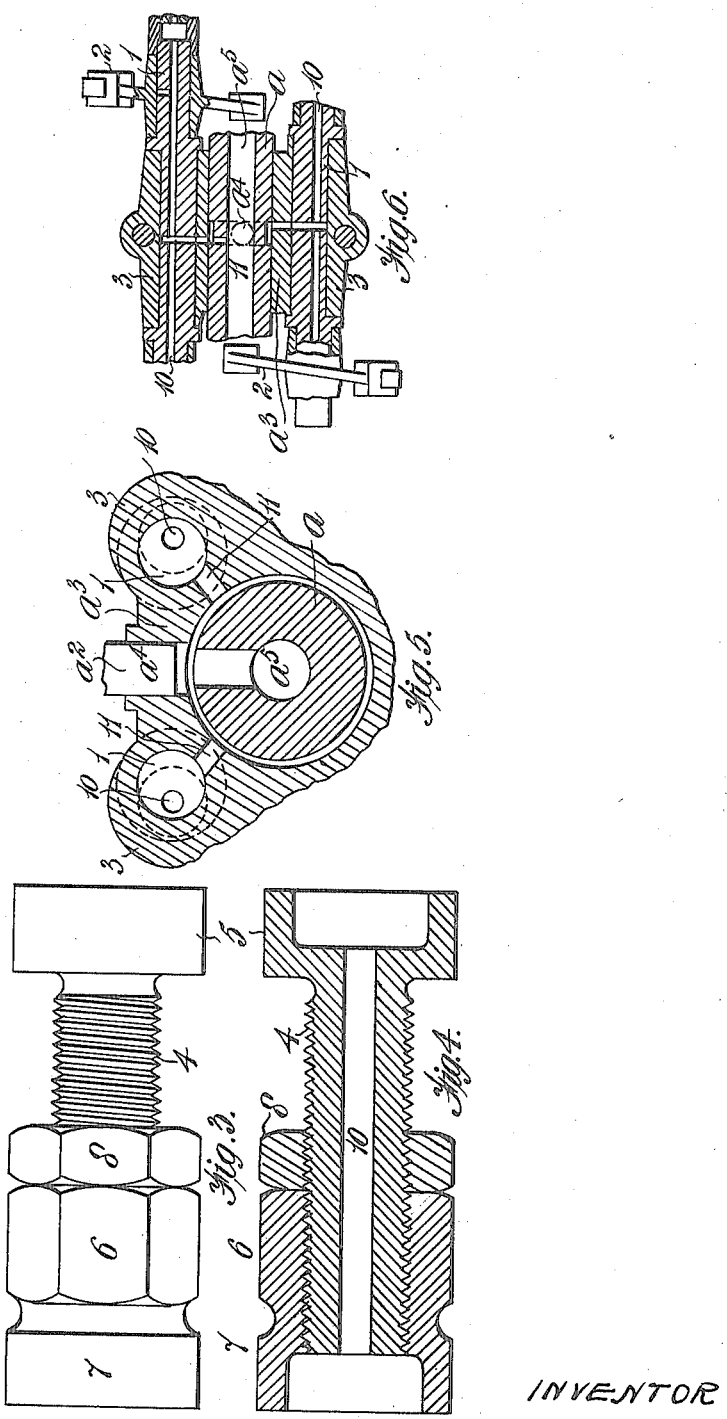

UNITED STATES PATENT OFFICE.

THEODORE LIVINUS REEPMAKER D'ORVILLE, OF TWICKENHAM, ENGLAND.

LUBRICATING SYSTEM FOR INTERNAL-COMBUSTION ENGINES.

1,264,494. Specification of Letters Patent. Patented Apr. 30, 1918.

Application filed March 28, 1917. Serial No. 158,065.

*To all whom it may concern:*

Be it known that I, THEODORE LIVINUS REEPMAKER, D'ORVILLE, a subject of the Queen of Holland, and resident of Twickenham, county of Middlesex, England, have invented certain new and useful Improvements in and Relating to Lubricating Systems for Internal-Combustion Engines, of which the following is a specification.

This invention relates to internal combustion engines of the type provided with a lubricating system, the intensity of which is proportionate not to the engine speed but to the engine power output, and the present invention has for its object the provision of an improved pressure lubricating means, said means comprising a sump, a cam shaft chamber and a vertical chamber or tunnel connecting said sump and cam shaft chamber, a pump of the gear-wheel type located midway in the chamber or tunnel, the vertical driving shaft of said pump having at its ends gear of the spiral bevel type engaging with similar gear on crank shaft and cam shaft, which cam shaft is provided with longitudinal and transverse oil passages, a suction pipe connecting said pump and sump and a flywheel to force lubricant through said suction pipe, a delivery pipe to said pump and pipes branching from said delivery pipe to feed by branches the main crank bearings and central cam shaft bearing, oil passages through said crank shaft to feed from the main bearings the big end connecting rod bearings, and from the big end bearing by small pipes or passages in the connecting rods to the gudgeon pin bearings, rocking lever shafts provided with longitudinal and transverse oil passages, oil passages leading from the central cam shaft bearing to feed the rocking lever oil passages, a hole in the cam shaft at pump end thereof to return oil to sump, while lubricating pump shaft bearings, a pipe to carry oil from cam shaft chamber to lubricate the combined dynamo and electromotor driving gear before returning to the sump, and an extension pipe leading from the feed pipe to the central cam shaft bearing to other parts, as and where required, of the automobile.

With the arrangement hereinafter set forth there obtains a pressure feed system of lubrication for and to all or any moving part of an internal combustion engine of any type, obviating as far as possible the necessity of additional bearings, couplings, brackets and the like to accommodate the accessories indispensable toward obtaining such lubrication. This system also secures an amount of lubricant to all moving parts of an internal combustion engine proportionate to the power output of such engine obtained by increased pressures on the pistons, and not, as at present obtains, proportionate to the speed of the engine regardless of the power given off by the same.

The invention is illustrated by the accompanying sheets of drawings, in which:—

Figure 1 is a longitudinal sectional view through the engine.

Fig. 1$^a$ is a view similar to Fig. 1 and showing the rear half of the engine equipped with the present lubricating system.

Fig. 2 is a plan view partly in section, taken through the cam shaft chamber.

Figs. 3 and 4 are respectively a longitudinal elevation and a longitudinal section of a coupling or connection hereinafter referred to, and drawn to an enlarged scale.

Figs. 5 and 6 are diagrammatic views illustrative of the lubrication of the rocking levers hereinafter referred to.

Like letters and numerals of reference indicate corresponding parts in the several figures.

Figure 1:
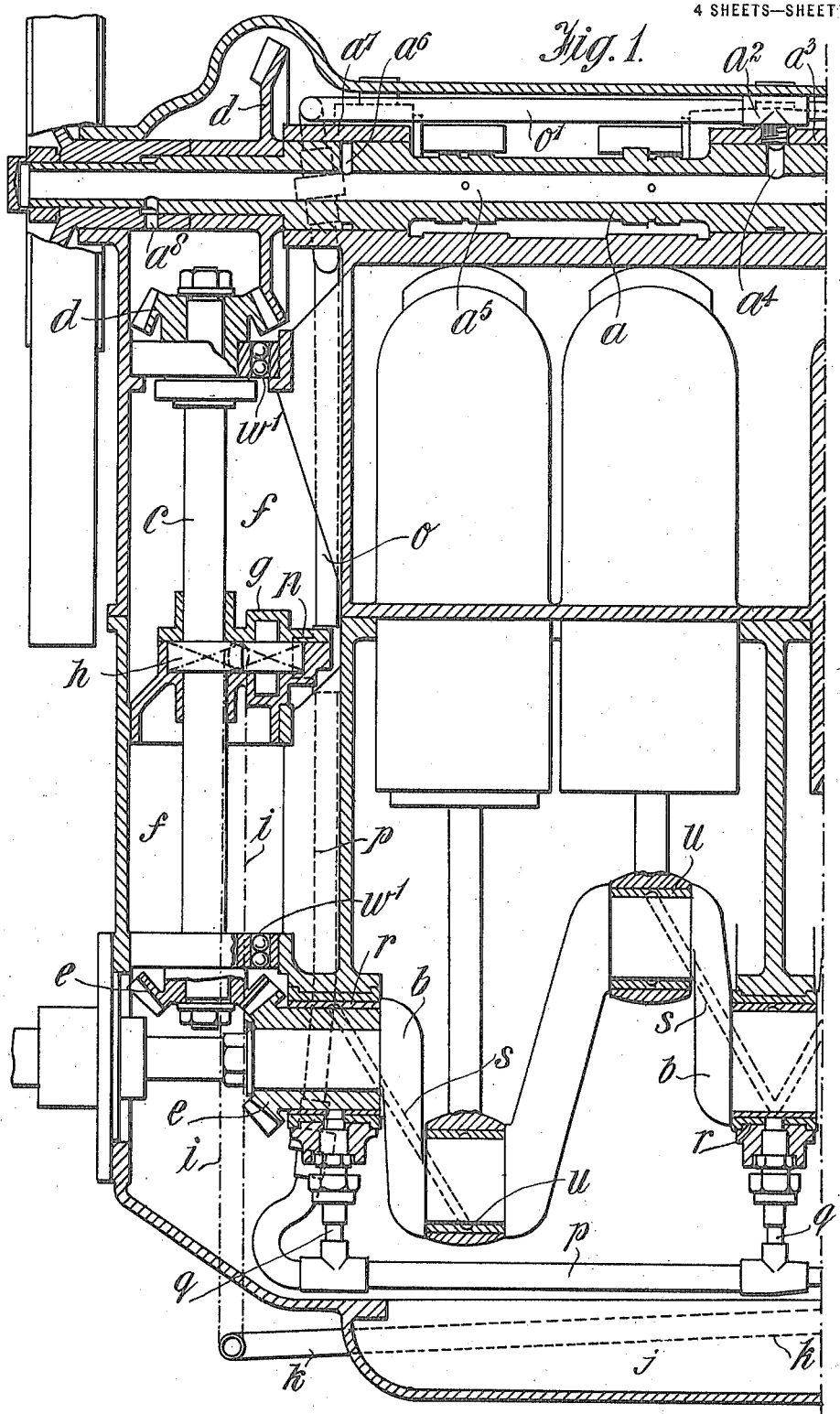

In carrying out the invention, the overhead cam shaft $a$—Figs. 1 and 2—is driven from the engine crank shaft $b$—Fig. 1—by means of an intermediate and vertically disposed shaft $c$ and two sets of spiral bevel gears $d$ and $e$ (right-handed and left-handed), so as to have the thrusts at either set of gears (*i. e.* top and bottom) equal but working in opposite directions. About halfway up the vertical shaft $c$ and in the chamber or tunnel $f$ surrounding said shaft is arranged the oil pump, indicated as a whole by $g$, which is of the gear-wheel type, of which the gear $h$ fixed to the vertical shaft $c$ is the driving gear. The pump suction branch $i$ is connected to the engine sump $j$—Fig. 1—by means of an oil pipe $k$, said pump and connection being so disposed as to make use of the pressure caused by the revolving flywheel $m$ to force the oil up said suction branch $i$ to the pump $g$ and to thereby reduce the suction head on said oil pump.

From the delivery pipe $n$ of the pump extend the pipes $o$ and $p$, the one $p$ running downward alongside of the pump shaft $c$, the other $o$ running upward—Fig. 1. Of these pipes, the down pipe $p$, which extends lengthwise of and in the lower part of the engine casing, feeds by way of suitable branch pipes $q$ the main bearings $r$ of the engine. From these bearings $r$ the oil passes by way of oil holes $s$, drilled in the crank shaft $b$, to the big end connecting rod bearings $u$, and from thence through small pipes $v$ up to the gudgeon pin bearings $w$, only one such pipe and pin bearing being shown in the drawing, or, in the case of connecting rods of circular section, through holes drilled down said connecting rod shafts up to the gudgeon pin bearings.

The up pipe $o$, which extends lengthwise of and in the upper part or cam shaft chamber $a'$ of the engine casing, feeds, by way of a suitable branch pipe or T-piece $a^2$, the cam shaft center bearing $a^3$, the oil passing from said bearing $a^3$ through a hole $a^4$ drilled in the cam shaft $a$ into a central and longitudinal oil passage $a^5$ in said shaft, from whence part of the oil is forced through suitable holes $a^6$ to lubricate the other cam shaft bearings $a^7$, while part of the oil escapes from a hole $a^8$—Fig. 1—in the pump end of said cam shaft $a$ to feed the driving gear $d$ and $e$ and bearings $w'$ of the pump shaft $c$, overflow passing downward and returning to the engine sump. Further, the extension $o'$ of the up pipe $o$ is provided with a branch pipe $o^*$ which takes all the remaining oil and goes to supply oil wherever required throughout the other parts of the chassis, as hereinbefore mentioned, including a branch to the oil pressure gage on the dashboard.

The overflow returns to the engine sump through a throttle which is located at any suitable position outside the casing and fixed thereto and takes the form of a cock or tap, on the plug of which is mounted a lever which is connected to the lever actuating the carbureter induction throttle, so that when induction throttle is opened wide, i. e. great engine power output, the oil throttle will tend to be practically closed, thereby augmenting the oil pressure in the oil pipe system and increasing the intensity of the general lubrication system, and vice versa.

The shafts or fulcrums 1 of the rocking levers 2—Fig. 2—which actuate the inlet and exhaust valves, not shown, are carried by bosses 3 on the sides of the cam shaft bearings $a^3$, $a^7$ and are held in position, in pairs, by means of specially designed couplings or connections. These connections or couplings consist—see Figs. 2, 3 and 4—of screw-threaded bolts 4 provided with cup or dished heads 5 and nuts 6 with cup or dished heads 7 and lock nuts 8 screwing on said bolts 4, the cup or dished head 5 of a bolt engaging the protruding end of one rocking lever shaft 1, while the cup or dished head 5 of its nut 6 engages the protruding end of another rocking lever shaft 1, requisite pressure on the shaft ends being obtained by screwing back the nut 6 and lock nut 8, said bolt and nut heads 5 and 7 also bearing against the bosses 9 of the rocking levers 2 with the necessary working clearances to allow of the requisite freedom of movement for said rocking levers 2. In this manner, bosses, fulcrums, bolts and nuts form a continuous shaft, one on each side of the cam shaft, said fulcrums 1, bolts 4 and nuts 6 being provided with a central and longitudinal oil passage 10 which communicates with oil passages 11 leading from the central cam shaft bearing $a^3$ to allow of the access of oil to the fulcrums 1 of the rocking levers 2 by holes 12 in said fulcrums.

Any oil dripping from the rocking levers 2 finds its way back to the sump either by way of the chamber or tunnel $f$ through which pass the pump shaft $c$ and oil delivery pipes $p$ and $o$ at the forward end of the engine, or else will be trapped at the rear end $a^*$ of the cam shaft chamber $a'$ of the engine and conveyed down a pipe $x$ to lubricate the combined dynamo and electromotor driving gear 12* before finally falling down into the sump.

All oil therefore returns to the sump, from whence it will again be sucked up by the pump to continue the cycle of lubrication.

The fulcrums of the rocking levers may—as shown in Figs. 2, 5 and 6—be in the form of eccentrics in order to obtain a ready and easy means of adjusting the valve stem clearances by simply swinging the fulcrum around the required angle after having previously slackened the beforementioned nuts.

The invention presents as advantages:— forced feed lubrication not only to all parts of the engine where lubrication is required, but also the means of automatically lubricating any other part of the chassis in general, where this may be useful, thus doing away with the use of the oil can. At the same time, as the lubrication is automatic and takes place from within and oil always working its way out, any dust, dirt, or the like will be washed out and away from the bearing or working surfaces, this being by no means the case with the present-day of hand lubrication.

A further advantage is the reduced number of pipes required, and in the case of the engine proper, a minimum number of external pipes, this being conducive to a neater looking, and, what is more, a cleaner running and more economical engine, as any oil pipe leakages which might occur will return to the engine sump and can be drawn from thence by the action of the pump.

A last point in favor of this invention resides in that it is cheaper to manufacture by reason of the vertical shaft bearings being used for the pump, the absence of any special gear and couplings or the like to drive the oil pump, and the elimination of oil pipes wherever possible.

Having now described my invention, what I claim as new and desire to secure by Letters Patent of the United States is:—

1. A lubricating system for internal combustion engines including in combination with the crank shaft mounted in suitable bearings, an oil pump operated by the crank shaft, a hollow cam shaft having a plurality of lubricant escape orifices, bearings for each end of said shaft and adapted to be supplied with lubricant from the orifices in said shaft, an intermediate lubricant distributing bearing for the said hollow cam shaft, hollow valve lever supporting shafts arranged on each side of the hollow cam shaft and in open communication with the lubricant distributing cam shaft bearing, and a lubricant conveyer pipe leading from the oil pump to the said intermediate cam shaft bearing.

2. A lubricating system for internal combustion engines including in combination with the crank shaft, an oil pump operated by said crank shaft, a hollow cam shaft operated from the crank shaft and having a plurality of lubricant escape orifices, bearings for said hollow cam shaft and adapted to receive lubricant from the interior thereof through said orifices, and a lubricant supply pipe leading from said pump to one of said bearings for supplying lubricant to said hollow cam shaft.

3. A lubricating system for internal combustion engines including in combination with the crank shaft, an oil pump operated by said crank shaft, a hollow cam shaft also operated by said crank shaft, bearings for said hollow cam shaft and adapted to be supplied with lubricant from the interior thereof by the orifices therein, a lubricant supply pipe between said pump and one of said bearings for supplying lubricant to the hollow cam shaft, hollow lever supporting shafts arranged on each side of the hollow cam shaft and journaled in the same bearings which support the cam shaft, and each being in open communication with the bearing which receives lubricant from said pump.

4. A lubricating system for internal combustion engines including in combination with the crank shaft mounted in suitable bearings, a pump operated by said crank shaft, a hollow cam shaft having lubricant escape orifices and also operated by the crank shaft, a lubricant conveyer pipe for conducting lubricant from the pump to said hollow cam shaft, and another lubricant conveyer pipe for conducting lubricant to the bearings of the crank shaft.

5. A lubricating system for internal combustion engines including in combination with the crank shaft, a vertical pump shaft geared to said crank shaft, a hollow cam shaft geared with the upper end of said pump shaft and having a plurality of lubricant escape orifices one of which is located above the gear on the pump shaft which drives the said cam shaft, a pump located at the intermediate portion of said pump shaft and driven thereby, and a lubricant supply pipe between said pump and said hollow cam shaft.

6. A lubricating system for internal combustion engines including the combination with the crank shaft mounted in suitable bearings and carrying a fly wheel, and the crank shaft casing, of a vertical housing formed at one end of said crank shaft housing, a pump shaft journaled therein and geared to said crank shaft, a hollow cam shaft journaled in a housing at right angles to said vertical housing and in communication therewith, said cam shaft being geared with the upper end of said pump shaft, a pump located in the said vertical housing and operated by the pump shaft therein, a lubricant supply connection for said pump having its inlet end disposed in relatively close proximity to the inner face of the fly wheel, and lubricant delivery pipes leading from said pump to said hollow cam shaft and main bearings of the crank shaft.

7. A lubricating system for internal combustion engines including in combination with the crank shaft mounted in suitable bearings, an oil pump operated by said crank shaft, a plurality of cam shaft bearings, a hollow cam shaft mounted in said bearings and having lubricant orifices at each bearing, an intake pipe for said pump, a lower oil delivery pipe leading from said pump to the main bearings of the crank shaft, an upper oil feed delivery pipe discharging only into one of the bearings of the cam shaft whereby oil may enter the latter through the orifice at the bearing, and hollow valve lever supporting shafts also mounted in said cam shaft bearings, and in open communication with the bearing which receives oil from the upper feed pipe from the pump.

In testimony whereof I have affixed my signature in presence of two witnesses.

THEODORE LIVINUS REEPMAKER D'ORVILLE.

Witnesses:
 ROBT. HUNTER,
 J. DORMODY.